US006151384A

United States Patent [19]

Reed et al.

[11] Patent Number: 6,151,384

[45] Date of Patent: Nov. 21, 2000

[54] X-RAY TUBE WITH MAGNETIC ELECTRON STEERING

[75] Inventors: Kim W. Reed; Bobby N. Turman; Ronald J. Kaye; Larry X. Schneider, all of Albuquerque, N. Mex.

[73] Assignee: Sandia Corporation, Albuquerque, N. Mex.

[21] Appl. No.: 09/115,322

[22] Filed: Jul. 14, 1998

[51] Int. Cl.$^{7}$ .............................. H01J 3/14; H01J 35/14; H01S 3/00

[52] U.S. Cl. ................................ 378/138; 372/2; 250/404

[58] Field of Search ................................ 378/138; 372/2; 250/404

[56] References Cited

U.S. PATENT DOCUMENTS

| | | | |
|---|---|---|---|
| 4,007,375 | 2/1977 | Albert | 250/404 |
| 4,104,526 | 8/1978 | Albert | 250/403 |
| 4,359,660 | 11/1982 | Smith et al. | 378/119 |
| 4,652,763 | 3/1987 | Nablo | 250/492.3 |
| 4,694,457 | 9/1987 | Kelley et al. | 372/2 |
| 4,764,947 | 8/1988 | Lesensky | 378/138 |
| 4,912,738 | 3/1990 | Turchi | 378/121 |
| 5,048,068 | 9/1991 | Turchi | 378/121 |
| 5,090,041 | 2/1992 | Furbee | 378/93 |
| 5,105,456 | 4/1992 | Rand et al. | 378/125 |
| 5,268,955 | 12/1993 | Burke et al. | 378/135 |
| 5,422,926 | 6/1995 | Smith et al. | 378/121 |
| 5,426,686 | 6/1995 | Rentzepis et al. | 378/34 |
| 5,442,678 | 8/1995 | Dinsmore et al. | 378/137 |
| 5,563,407 | 10/1996 | Yamagishi | 250/214 UT |
| 5,610,967 | 3/1997 | Moorman et al. | 378/154 |
| 5,621,780 | 4/1997 | Smith et al. | 378/65 |

*Primary Examiner*—Frank G. Font
*Assistant Examiner*—Armando Rodriguez
*Attorney, Agent, or Firm*—V. Gerald Grafe

[57] ABSTRACT

An X-ray tube uses a magnetic field to steer electrons. The magnetic field urges electrons toward the anode, increasing the proportion of electrons emitted from the cathode that reach desired portions of the anode and consequently contribute to X-ray production. The magnetic field also urges electrons reflected from the anode back to the anode, further increasing the efficiency of the tube.

14 Claims, 9 Drawing Sheets

FIG. 6

Larmor Radius

Boltsmann's Constant ($K_{eV/°K}$) = 8.63E−05 eV/°K
Boltsmann's Constant ($K_{MKS}$) = 1.38E−23 J/°K
electron mass (m) = 9.10E−31 kg
electron charge (e) = 1.60E−19 Coul
M/m = 1837 Ratio of Electron Mass to Hydrogen Mass Convenient Formula:

$$R_{LARMOR} = 1.4\ \text{sqrt}(TeV \times m/M)/B_{kG}$$ (mm)

where, $TeV = K_{eV/°K}\ T°K$
$T°_K$ = Temperature in °K
$B_{kG}$ = B−field in kG In MKS:

$$R_{LARMOR} = m\ V_{the}/(eB)$$ (meters)

where, $V_{the} = \text{sqrt}(2\ K_{MKS}\ T/m)$ electron Thermal Velocity

| Cathode Filament Temp. (°K) | Electron Thermal Energy TeV (eV) | Applied B−field (kG) | $R_{LARMOR}$ (mm) | Electron Thermal Speed (meter/sec) | Check using MKS Formula $R_{LARMOR}$ (mm) |
|---|---|---|---|---|---|
| 2000 | 0.1726 | 0.00136 | 10.00 | 246291 | 10.32 |
| 2020 | 0.1743 | 0.00136 | 10.00 | 247520 | 10.32 |
| 2040 | 0.1761 | 0.00137 | 10.00 | 248742 | 10.32 |
| 2060 | 0.1778 | 0.00138 | 10.00 | 249958 | 10.32 |
| 2080 | 0.1795 | 0.00138 | 10.00 | 251169 | 10.32 |
| 2100 | 0.1812 | 0.00139 | 10.00 | 252373 | 10.32 |
| 2120 | 0.1830 | 0.00140 | 10.00 | 253572 | 10.32 |
| 2140 | 0.1847 | 0.00140 | | | |
| 2160 | 0.1864 | 0.00141 | | | |
| 2180 | 0.1881 | 0.00142 | | | |
| 2200 | 0.1899 | 0.00142 | | | |
| 2220 | 0.1916 | 0.00143 | | | |
| 2240 | 0.1933 | 0.00144 | | | |
| 2260 | 0.1950 | 0.00144 | | | |
| 2280 | 0.1968 | 0.00145 | | | |
| 2300 | 0.1985 | 0.00146 | | | |
| 2320 | 0.2002 | 0.00146 | | | |
| 2340 | 0.2019 | 0.00147 | | | |

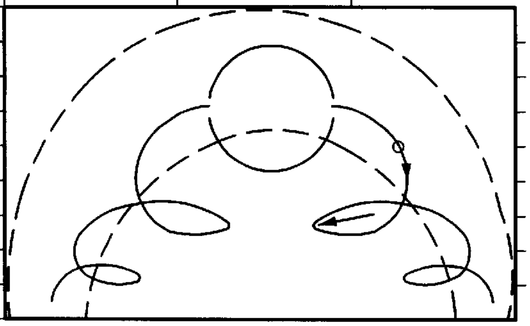

X-RAY TUBE WITH MAGNETIC ELECTRON STEERING

This invention was made with Government support under Contract DE-AC04-94AL85000 awarded by the U.S. Department of Energy. The Government has certain rights in the invention.

BACKGROUND OF THE INVENTION

This invention relates to the field of X-ray tubes, specifically tubes wherein a magnetic field urges electrons toward the anode.

X-ray sources have many applications. For example, hundred kilovolt X-ray tubes can be used in agriculture for de-infestation of fruits, vegetables, grains, and lumber. They can also be used to sterilize food for storage without refrigeration, and to destroy pathogenic microorganisms in meat, seafood, and poultry. They can also be used for non-destructive testing and inspection of industrial tools and systems (e.g., airplanes) and for water purification.

Many X-ray tubes consist of an electron source and an accelerating potential that impinges a beam of electrons onto an X-ray conversion target anode. The anode is typically made of a high atomic number material so that it efficiently decelerates the electrons that penetrate into it, thus generating Bremsstrahlung X-radiation. Many production processing applications require electron beams of only a few hundred kilovolts accelerating potential, so the X-ray pattern is substantially isotropic.

One common X-ray tube design involves a diode, wherein a heated cathode provides electrons and an applied voltage between the cathode and an anode accelerates the electrons onto the anode. Field shaping electrodes around the cathode can be used the create an accelerating electric field that will focus the electron beam onto the anode. A large part of the energy in the electrons can be converted into heat in the anode; some of the energy is carried away by electrons that miss or bounce off the target; the remaining small portion is converted into subsequently reflected from anode A1, they will carry away energy that might otherwise have further contributed to X-ray production. Radiation along directions other than through the window W1 can be absorbed by cathode C1, anode A1, and envelope E1, contributing to undesirable heating of tube T1 rather than to useful radiation of the target TG1.

Accordingly, there is a need for an improved X-ray tube that provides increased X-ray generation efficiency by reducing the number of electrons that do not contribute to X-ray production.

SUMMARY OF THE INVENTION

The present invention provides an X-ray tube that uses magnetic steering of electrons to increase the tube's efficiency and reduce the external cooling required.

The present invention provides a cathode and anode mounted with an evacuated envelope. A magnetic field generator imposes a magnetic field that urges electrons toward the anode, reducing the number of electrons that would otherwise escape the anode and cause electron heating of the tube. The magnetic field also urges electrons toward the portions of the anode that will produce X-rays that are not shadowed by the cathode, improving the useable X-ray pattern.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 6 is an exposition of Larmor radius corresponding to the example design.

DETAILED DESCRIPTION OF THE INVENTION

The present invention provides an X-ray tube that uses magnetic steering of electrons to increase the tube's X-ray production efficiency and reduce cooling required to cool the X-ray tube.

Figure 1:
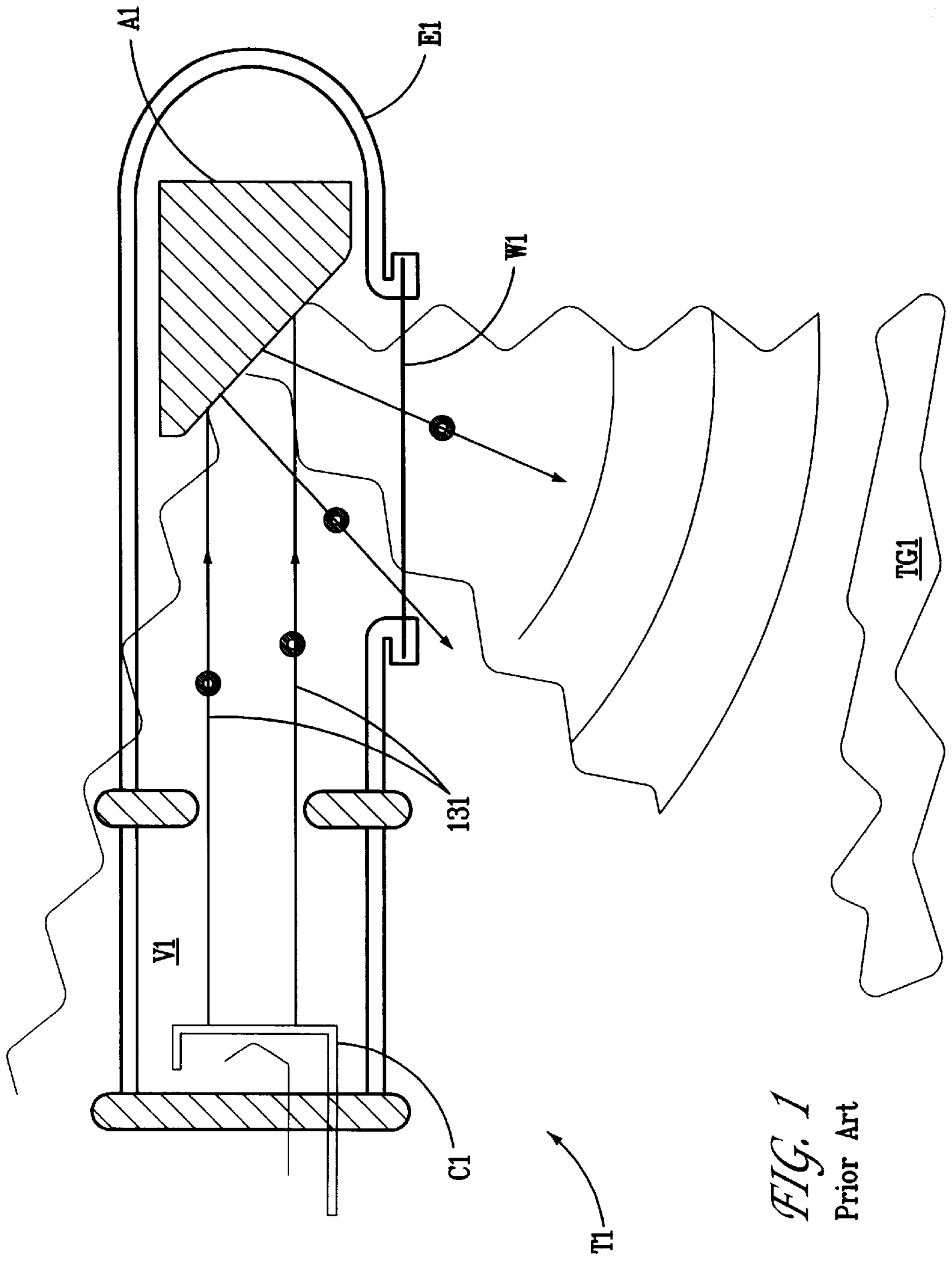
FIG. 1 Prior Art
FIG. 1 is a schematic view of a conventional X-ray tube.
Figure 2:
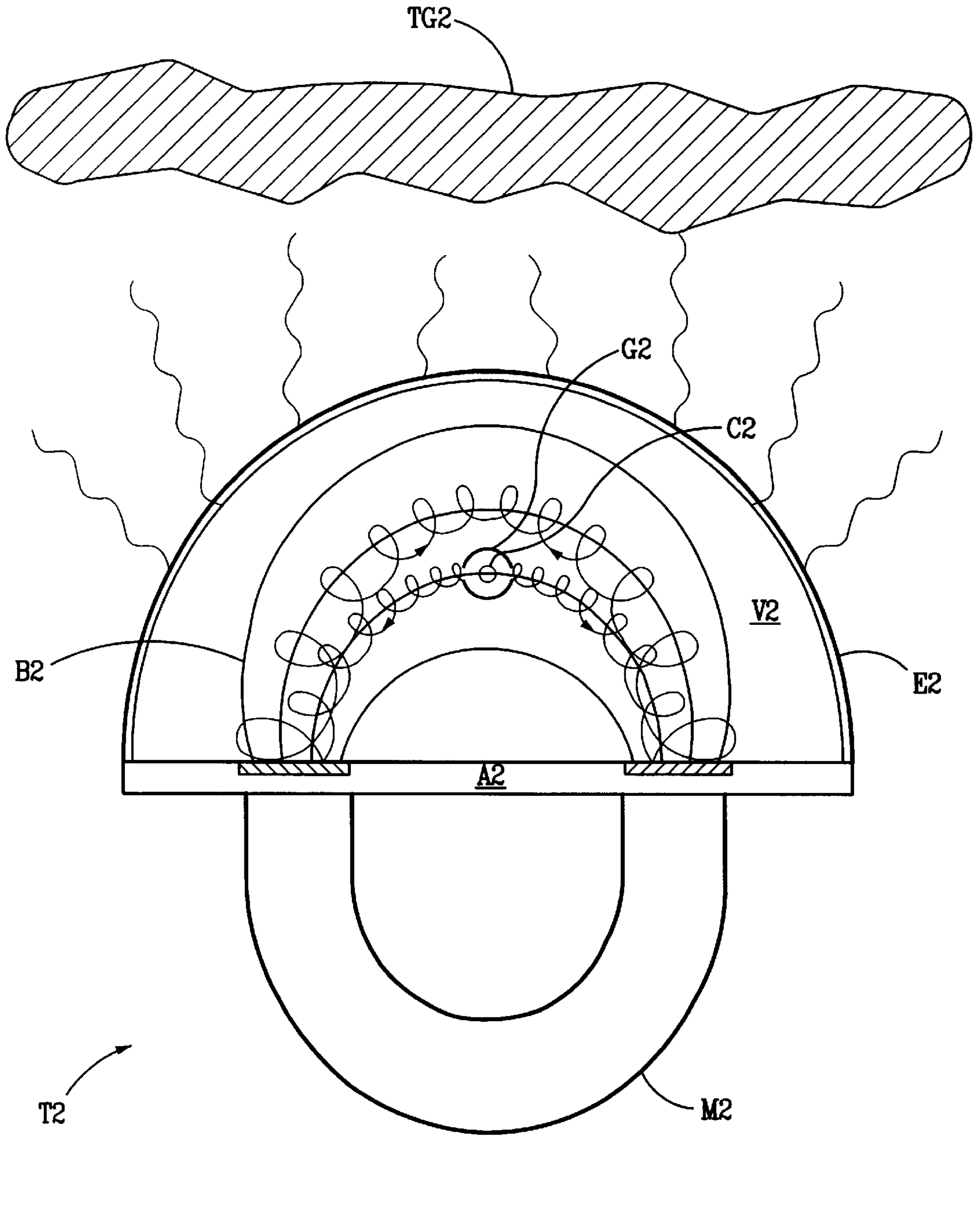
FIG. 2 is a schematic view of an X-ray tube according to the present invention.

FIG. 2 shows a schematic view of an X-ray tube T2 according to the present invention. Envelope E2 defines an evacuated interior volume V2. Cathode C2 mounts with envelope E2 so that at least a portion of cathode C2 is in communication with interior volume V2. Anode A2 mounts with envelope E2 so that at least a portion of anode A2 is in communication with interior volume V2. Magnetic field generator M2 mounts with envelope E2. Grid G2 mounts with envelope E2 and can modulates the quantity and initial trajectories of electrons from cathode C2.

A narrow cathode C2 and grid G2 structure such as shown in FIG. 2 can minimize shadowing of generated X-rays. The electric field lines from a narrow cathode C2 and grid G2 structure are divergent, however, making it more likely that electrons from cathode C2 and grid G2 structure will not hit the anode A2 and generate X-rays, but rather strike other structures and generate only heat. Thus, when using a narrow cathode C2 and grid G2 structure it can be important to provide a means of containing and guiding the electrons from narrow cathode C2 and grid G2 structure onto the anode A2.

Grid G2 surrounds cathode C2 and moderates the flow of electrons from cathode C2. This in turn controls the impedance of the electron gun (cathode, grid, and anode) and power output of the tube T2. If a grid were not provided, the impedance of the electron gun would be very low (space charge limited flow) and it would be difficult to limit the power output of the X-Ray tube to the desired level. Furthermore, an unnecessarily large power input to the tube T2 would be needed to keep the voltage up between the anode A2 and cathode C2. It is desirable to generate only the required amount of X-Ray power to the target TG2 and in turn supply no more than the minimum amount of power to the tube T2 needed to generate this required X-Ray output.

Grid G2 can discourage electrons from leaving cathode C2 on paths directly to anode A2, reducing the production of X-rays that would be shadowed by cathode C2. Grid G2 can also discourage electrons from leaving cathode C2 on paths that are substantially away from anode A2, reducing electron heating of envelope E2 by electrons on paths that intersect envelope E2 before they intersect anode A2.

In operation, cathode C2 emits electrons. Electrons from cathode C2 have initial velocity vectors away from cathode C2, substantially conformed to magnetic field lines B2. For electrons to contribute to X-ray production they must reach anode A2. Magnetic field generator M2 generates a magnetic field represented by magnetic field lines B2.

Lorentz forces act on electrons due to the applied magnetic field:

$$\vec{F} = e\left\{\vec{E} + \vec{v} \times \vec{B}\right\} \quad \text{equation 1}$$

where $\vec{F}$ is the force vector on the electron due to the combined electric and magnetic fields, e is the charge of an electron, $\vec{E}$ is the local electric field due to the voltage applied between cathode C2 and anode A2, $\vec{v}$ is the electron velocity vector, x denotes vector cross product, and $\vec{B}$ and is the local applied magnetic flux density vector. The Lorentz forces cause the electrons to spiral around the direction of the applied magnetic field and constrain their net motion to be along the magnetic field. Electrons can thus be prevented from impacting other parts of tube T2 Electrons scattered from anode A2 spiral along the magnetic field lines and are directed back toward anode A2 so that a higher percentage of electrons will contribute to X-ray production.

Electrons on trajectories that terminate at anode A2 are do not require urging by magnetic field B2. Such electrons, unless scattered from anode A2, contribute to X-ray production, and do not cause electron heating of any part of the tube other than anode A2.

Scattered electrons impact anode A2 and are reflected therefrom. Electron scattering from anode A2 reduces the efficiency of X-ray production. Such scattered electrons are urged by magnetic field B2 back to anode A2. If such scattered electrons were not affected by magnetic field B2, they could impact envelope E2 and contribute to electron heating thereof rather than to X-ray production. Steering of scattered electrons by magnetic field B2 accordingly increases X-ray production efficiency and reduces electron heating of envelope E2.

Electrons on initial trajectories that do not terminate at anode A2 are also urged toward anode A2 by magnetic field B2. Magnetic field B2 urges such electrons along paths spiraling around magnetic field lines B2, intersecting anode A2. If such electrons were not affected by magnetic field B2, they would impact envelope E2 and contribute to electron heating thereof rather than to X-ray generation. Consequently, steering of such electrons by magnetic field B2 reduces electron heating of envelope E2 and increases the efficiency of X-ray production.

Figure 3:
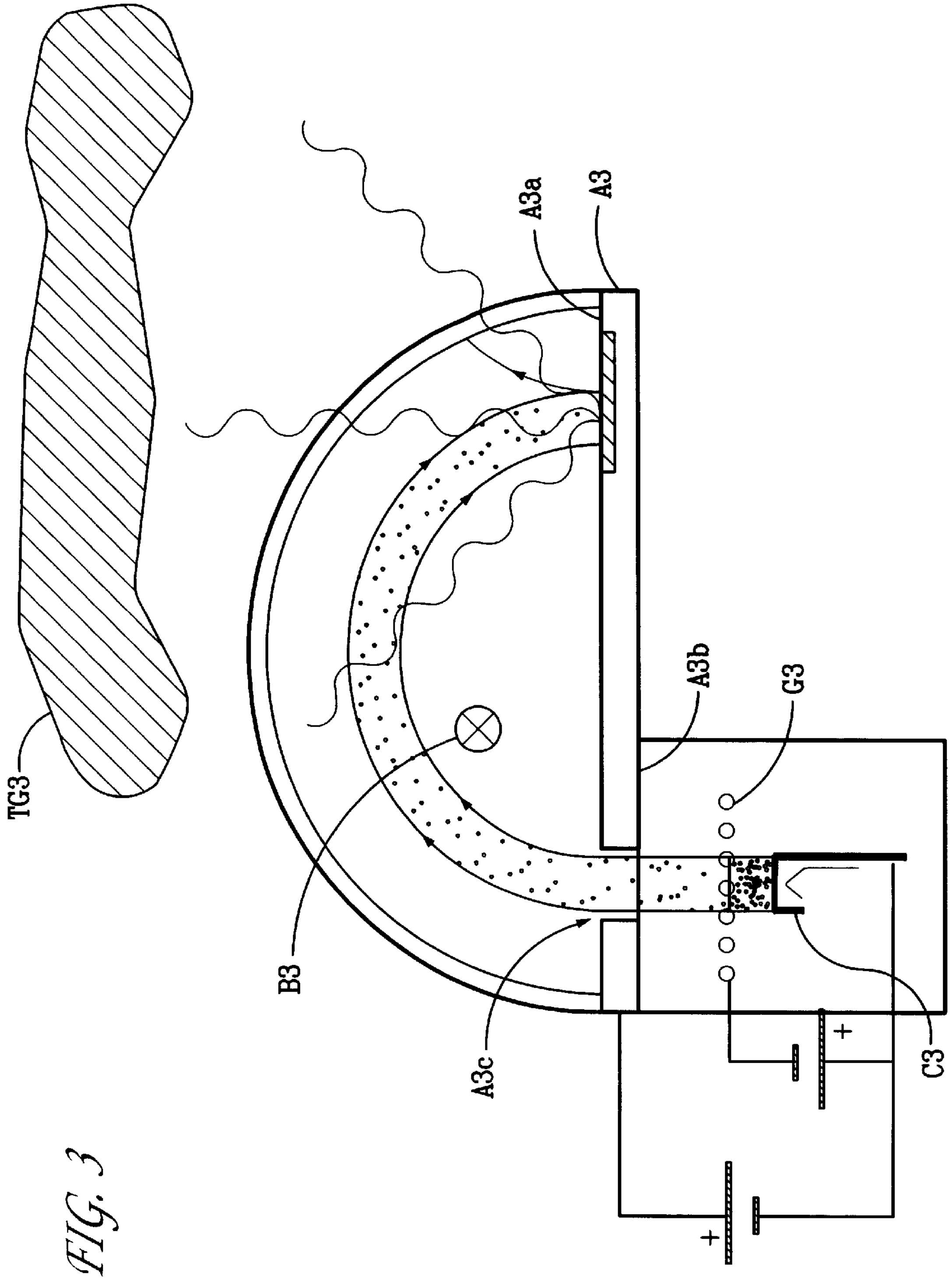
FIG. 3 is a schematic view of an X-ray tube according to the present invention.
Figure 4A:
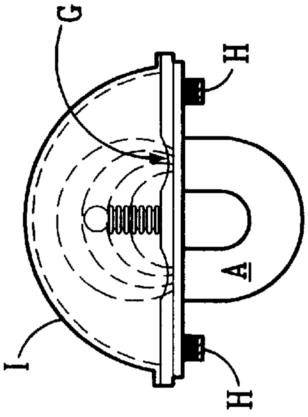
FIGS. 4(*a*,4*b*,4*c*,4*d*) is a schematic view of an example design according to the present invention.
Figure 4B:
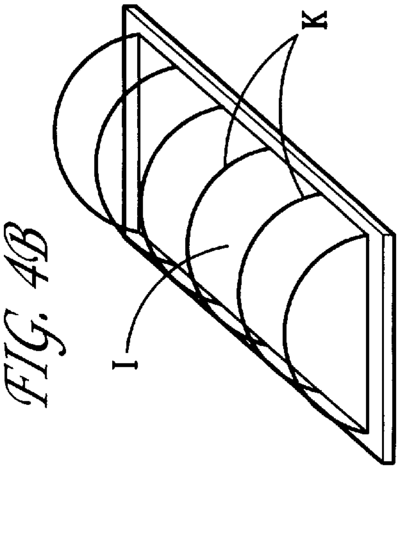
Figure 4C:
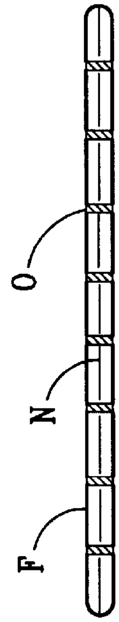
Figure 4D:
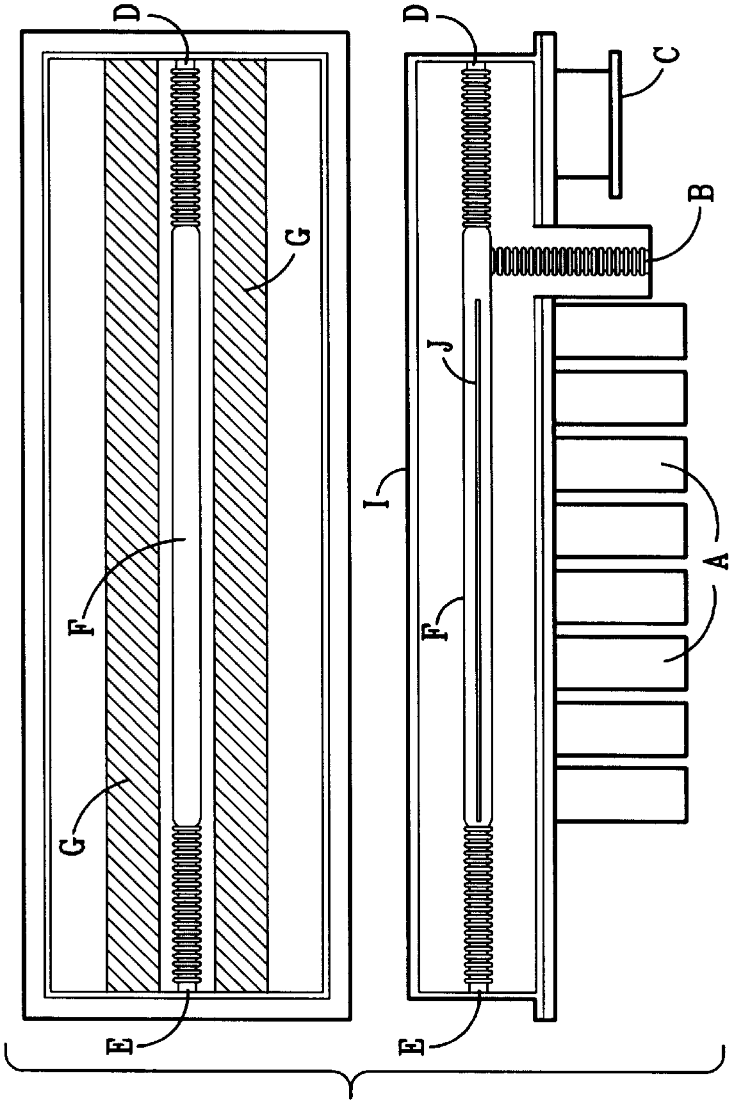

Another embodiment of the present invention is shown in FIG. 3. A grid G3 and cathode C3 are placed behind an anode A3, where the front face A3*a* of anode A3 is designated as the side from which X-radiation is emitted. Electrons are accelerated by an accelerating potential from the grid G3 and cathode C3 toward the back face A3*b* of anode A3. When they reach anode A3 they pass through an opening A3*c* in anode A3 and enter a magnetic field B3 on the front side of anode A3 that is directed transverse to the direction in which the electrons are moving. Magnetic field B3 produces a Lorentz force on the electrons that curves their trajectories back onto the front face A3*a* of anode A3. X-rays are generated where the electrons strike anode A3 and are radiated in the forward direction away from the front face A3*a* of anode A3.

The embodiment illustrated in FIG. 3 has several differences with respect to the embodiment illustrated in FIG. 2. For example, it may be possible to use a weaker applied magnetic field to bend the electron trajectories back onto the anode in the embodiment of FIG. 3, depending upon the allowable radius of curvature of the electron trajectories in front of the anode. Also, in the embodiment of FIG. 3, there is no shadowing of the X-rays generated in the useful forward direction by the grid and cathode structure (since the grid and cathode are behind the anode).

The embodiment of FIG. 3 separates the region where the trajectory of the electrons is bent by the applied magnetic field and the region where the electric field accelerates them. Depending upon the intensity of the accelerating electric field, the spacing between the anode and cathode must be large enough to prevent uncontrolled electron flow between the cathode and anode. This limitation also applies to the spacing that can be tolerated between the vacuum envelope and the grid/cathode structure. If the grid/cathode is on the front side of the anode, as in the embodiment illustrated in FIG. 2, the minimum anode-cathode and cathode-envelope spacings impose a bound upon how close the product that is being irradiated can be placed to the source of X-rays. Conversely, if the grid/cathode is behind the anode, as in the embodiment of FIG. 3, then the bend radius of the electron beam on the front side of the anode determines how close the vacuum envelope can be to the source of X-rays at the anode without the electrons striking the vacuum envelope. The bend radius can be made as small as desired by controlling the applied magnetic field.

In the embodiment illustrated in FIG. 3, however, scattered electrons can impact the envelope since the magnetic field does not return reflected electrons to the anode so that they can further contribute to X-ray production.

Example X-Ray Tube

Considerations useful in the design of an X-ray tube according to the present invention are presented below, along with details associated with a specific design.

Cathode Filament

Thermionic cathodes (emitting electrons when heated) can be made from materials that are specially treated so that they readily emit electrons in plentiful quantities when heated to temperatures below the melting points of the cathode material. Materials suitable for use in thermionic cathodes include oxide coatings, nickel, impregnated nickel, impregnated tungsten, plain tungsten and thoriated tungsten. Thoriated tungsten is one of the most common and useful of the thermionic cathode materials because it exhibits a generous electron emission current density (4 Amperes/cm$^2$) when heated to about 2000° Kelvin, that is relatively independent of the exact temperature over a range of about 100° Kelvin.

Anode Material

The anode can comprise two portions: an X-ray converter portion, and a supporting substrate. Anode materials should have minimal out-gassing properties to minimize the gas generated by the thermal and radiation fluxes.

A coating or layer of high atomic number material on the anode can comprise an X-ray converter portion. It preferably is of a thickness at least equivalent to the penetration depth range of electrons with the energy of the anode-cathode accelerating potential. At the lower accelerating potentials that are required by many applications, the conversion of electron energy into X-rays is only a few percent efficient. Since the electron energy that doesn't go into the production of X-Rays mostly goes into the heating of the anode, the anode of a high power continuously operating X-Ray tube must sustain a tremendous heat flux. Furthermore, production efficiency of X-Rays by the anode is a function of both the mass density and atomic number of the anode material. Higher densities and higher atomic numbers convert electron energy more efficiently into X-Rays. Materials with high melting points, high density and high atomic numbers are suitable for the X-Ray converter portion of the anode in X-Ray tubes according to the present invention. Examples of these include tantalum (atomic number 73) and tungsten (atomic number 74), which can be flame sprayed or sputtered onto the anode.

The anode substrate that the X-ray converter layer is on should be sufficiently thick to allow the removal of the heat generated in the X-ray conversion layer. The anode substrate that supports the X-ray conversion layer can be made of a suitable magnetic material and shape so as to shape the magnetic field which guides the electrons onto the X-ray converter portion of the anode.

Grid Material

Calculations for a typical design indicate that due to the isolation of the grid structure in the vacuum envelope, it is possible for the grid to be heated to hundreds, up to even 1000° Kelvin by the hot cathode filament that it surrounds. It is possible to cool the grid by convection of air or water through a manifold or tube that is in intimate contact with the inside of the grid. However, if the grid is made of a high melting point material, such as stainless steel, tungsten or titanium it is possible and simpler to allow the grid to cool radiatively. The grid material must be made of an electrically conductive material so that it can perform as an electrode.

Envelope Material

The envelope material preferably has minimal out-gassing properties to minimize the gas generated by the thermal and radiation fluxes. The envelope material preferably is a good thermal conductor so that it will help carry away the heat generated by the X-radiation that hits it. The envelope material preferably is tolerant of continual bombardment by X-radiation. The envelope material preferably absorbs as little of the generated X-rays as possible, making it preferable to choose a material that has a low atomic number, a low mass density and sufficient strength so that thin sections can serve as a vacuum vessel. Titanium is one of the most commonly used window or envelope materials because it is relatively inexpensive and it is sufficiently strong that it can be made extremely thin, compensating for higher density and atomic number compared with other envelope materials. If a supporting structure (like the supporting framework in a tent—called a "hibachi") can be used, then aluminum is a commonly used window material due to its low cost, low atomic number and low density. A recommended electron and X-Ray window material is beryllium. It has an atomic number of only 4, a very low mass density, high tensile strength, a high melting point and a high thermal conductivity. All of these properties are desirable in an X-Ray envelope window. Beryllium, however, is expensive, hard to obtain in large sheets, and forms a toxic oxide. A window portion of an envelope can be made of multiple layers of different metals to act as a deliberate filter for the X-ray spectrum that emerges from it.

Magnetic Field Generator

The magnetic field generator can comprise a permanent magnet or a combination of a permanent and electro-magnet with a suitable pole-piece configuration to achieve the required guiding magnetic field around and between the anode and cathode structures. A suitable magnet can be made using a material such as Alnico, carbon steel, chromium steel, cobalt steel, Cunico, Cunife, Ferroxdur, Silmanol, Vicalloy, Alni, Oerstit, Comol, Remalloy, platinum-cobalt, tungsten-steel, Alcomax, and combinations thereof.

Operation

Accelerating Potential

An accelerating potential of 10 Kilovolts to several 100 Kilovolts is suitable. The accelerating potential used depends upon the application. Higher potentials yield greater X-ray penetration and a narrower beam of X-rays. The accelerating potential can be selected upon the basis of required X-ray energy and spectrum to achieve optimal penetration of the target product. The acceleration potential can depend upon product thickness, density, X-ray absorption characteristics, X-ray attenuation properties, and treatment uniformity requirements. The acceleration potential can also depend upon whether the product is being irradiated from only one side or from two or more sides.

Magnetic Field Strength

Magnetic field strength of 0.001 Tesla to 0.1 Tesla is suitable. The applied magnetic field along with the potential through which the electron has been accelerated at each point along its trajectory determines the radius with which it spirals around the magnetic field line that it is "on". This radius is called the Larmor radius and is given by equation 2.

$$R_L=(mv)/(eB) \qquad \text{equation 2}$$

In equation 2, m is the mass of the electron, e is the electronic charge, v is the magnitude of the electron velocity in the plane perpendicular to B, and B is the magnitude of the magnetic flux density at the point of interest.

Duty Cycle

Intermittent to continuous operation are appropriate. Some applications require intermittent duty and some require continuous duty. For example, in an assembly line food processing application where separate crates are moving along a conveyer, the X-ray beam can be turned off between crates. On the other hand, if produce lying loose on a conveyer is being treated, the X-ray machine can be operated continuously.

Predicted X-Ray Intensity 0.25 krads/second to 1 krads/second, a range in which most industrial applications fall, is attainable.

Cooling Requirements

The grid can be cooled with radiative cooling or forced convection cooling. The window can be cooled with natural convection cooling. The anode can be cooled with forced water convection through a cooling manifold.

The cooling regime used depends upon the allowable temperature of the structure being cooled and the amount of heat power being removed. Typically the anode is absorbing most of the electron energy and is generating the most heating power. Since the vacuum seal and outside world (including human operators) is exposed to the potentially extremely high temperature of the anode, it is desirable to keep the anode cool. Therefore, the anode can use a more aggressive cooling scheme such a forced liquid convection. The grid is the second most heated component since it surrounds the thermionic cathode and is relatively isolated in the vacuum. If the grid is made of a high temperature material, however, there is no reason that it cannot be allowed to run hot, allowing the possibility of natural radiative cooling. If it is necessary to keep the grid cool, then forced convection is an option. The X-ray window can be made so that it allows most of the X-ray energy to pass through it. Therefore, it should receive a minimum of heating, allowing it to be cooled by the natural convection of the air around it.

Example Design

FIGS. 4(*a,b,c,d*) shows an example design according to the present invention. The device generates X-rays in the forward direction for commercial processing applications. The forward direction is defined as the side of the tungsten anode G that the elections strike in order to generate X-rays. In the example design the cathode/grid assembly is made very narrow so that it doesn't obstruct the generated X-rays. Also, the electrons are focused onto the desired anode regions by an applied magnetic field in spite of the divergent electric field.

Figure 5:
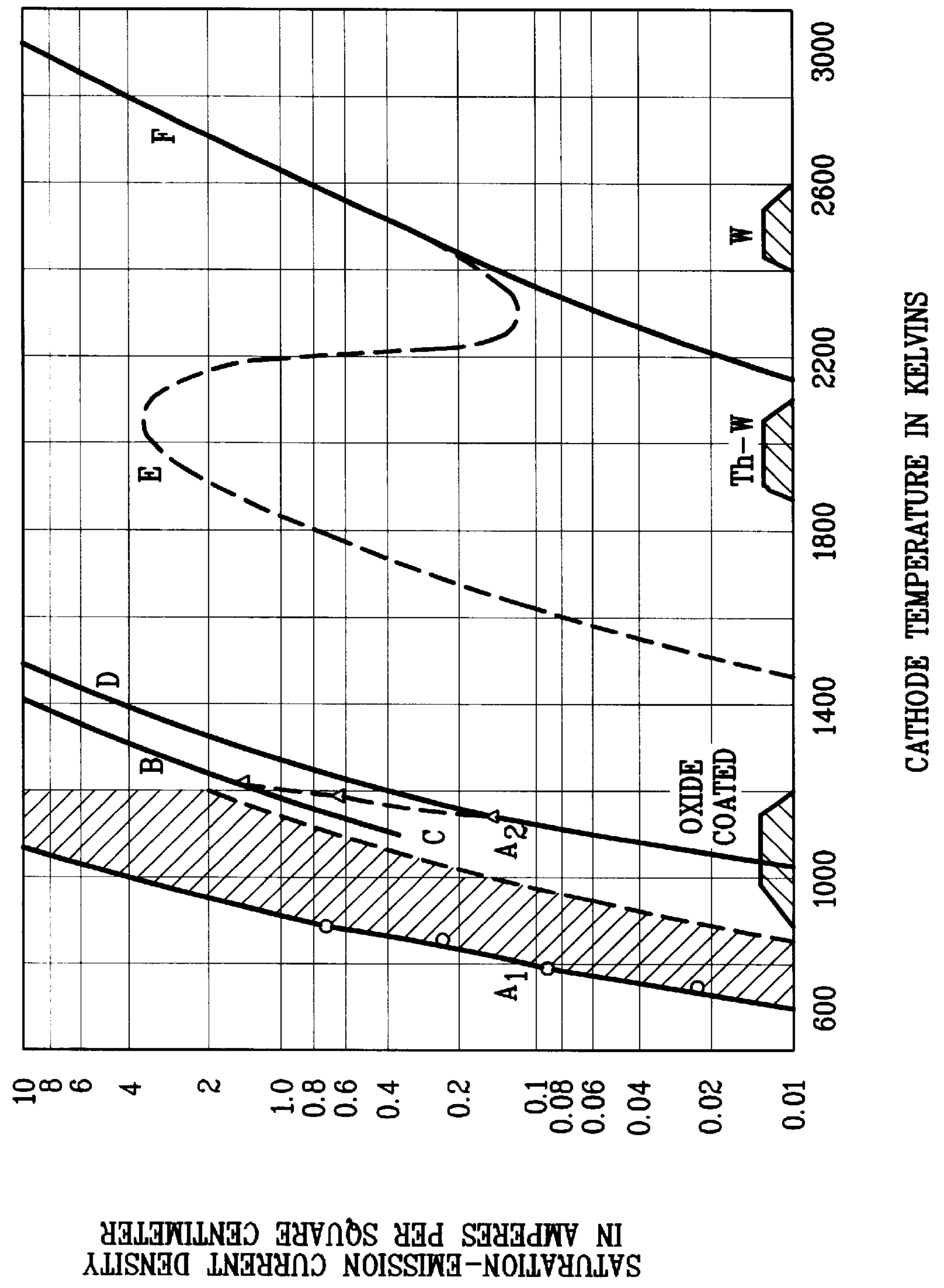
FIG. 5 is a chart of current variation versus filament temperature corresponding to the example design.

The thoriated tungsten cathode filament N housed in the control grid F can be resistively heated by passing an electrical current through it via the electrical feed-throughs D, E. The cathode filament is supported inside the anode tube by ceramic disks O. As shown in FIG. 5, if the thoriated tungsten cathode filament is heated to about 2050° Kelvin, it will emit about 3.5 Amperes of electrons per square centimeter of cathode surface area. As shown in FIG. 5, the current flux in this cloud of electrons is essentially independent of temperature provided the temperature swings are less than ±50° Kelvin around the nominal temperature of 2050° Kelvin. In FIG. 5, $A_1$ corresponds to oxide coated, puled current heated, $A_2$ to oxide coated, direct current heated, B to pressed nickel, C to impregnated nickel, D to pressed and impregnated tungsten, E to thoriated tungsten, and F to a tungsten filament. An accelerating potential is applied to the cathode relative to the anode via the feed-throughs D, E and a small retarding electrical potential relative to the cathode is applied to the control grid via the electrical feed through B. The region between the cathode and control grid is operating in the space charge limited flow regime. As can be seen from equation 3, the potential between the cathode and grid that is necessary to cause the current that is desired for this particular design to flow from the cathode to the grid and out the grid slit, J, is about 87 volts. In equation 3, L is the length of the grid/cathode; β=1 for $r_{Grid}/r_{Cathode}>10$; $V_{Grid}$ is the grid voltage; $r_{Grid}$ is the grid radius, 1" in the example design. A triode power of 150 kW corresponds to a grid voltage of 87V; a triode power of 6 kW corresponds to a grid voltage of 10V.

$$I_{cathode} = (14.6e-6)\frac{V_{Grid}^{3/2}L}{\beta^2 r_{Grid}}\text{Amps} = 0.47\text{ Amps} \quad \text{equation 3}$$

The electrons that are emitted through the slits in the grid tube are accelerated by the electrical potential between the cathode and anode G. Without a magnetic field these electrons tend to follow the electric field lines of force set up by the potential between the cathode and anode. The grid should be small in diameter so that it doesn't obstruct the X-rays that are radiated toward it from the anode. Since the grid tube is small in-diameter compared to the spacing between the grid and the anode, the electric lines of force that the electrons will follow in the absence of an applied magnetic field are very divergent. Without an applied magnetic field the electrons will strike all over the inside of X-ray window I in addition to all over the back plate G. In the presence of the applied magnetic field the electrons will still be accelerated by the applied electric potential between the grid and anode but they will spiral around the magnetic field lines as shown in FIG. 6. For a given electron the radius of the spiral at a given point along the election trajectory will depend upon the initial velocity that the electron has at right angles to the magnetic field as is leaves the and slit and upon the strength of the magnetic field at the given point aloe, the electron trajectory. FIG. 6 shows that an applied magnetic field of 1.4 Gauss is required in order to make the electrons from the anode slit hit a 20 mm wide anode target zone when the electrons leaving the anode slit are heated to 2050° Kelvin. Horseshoe magnets A apply the required magnetic field.

Figure 7:
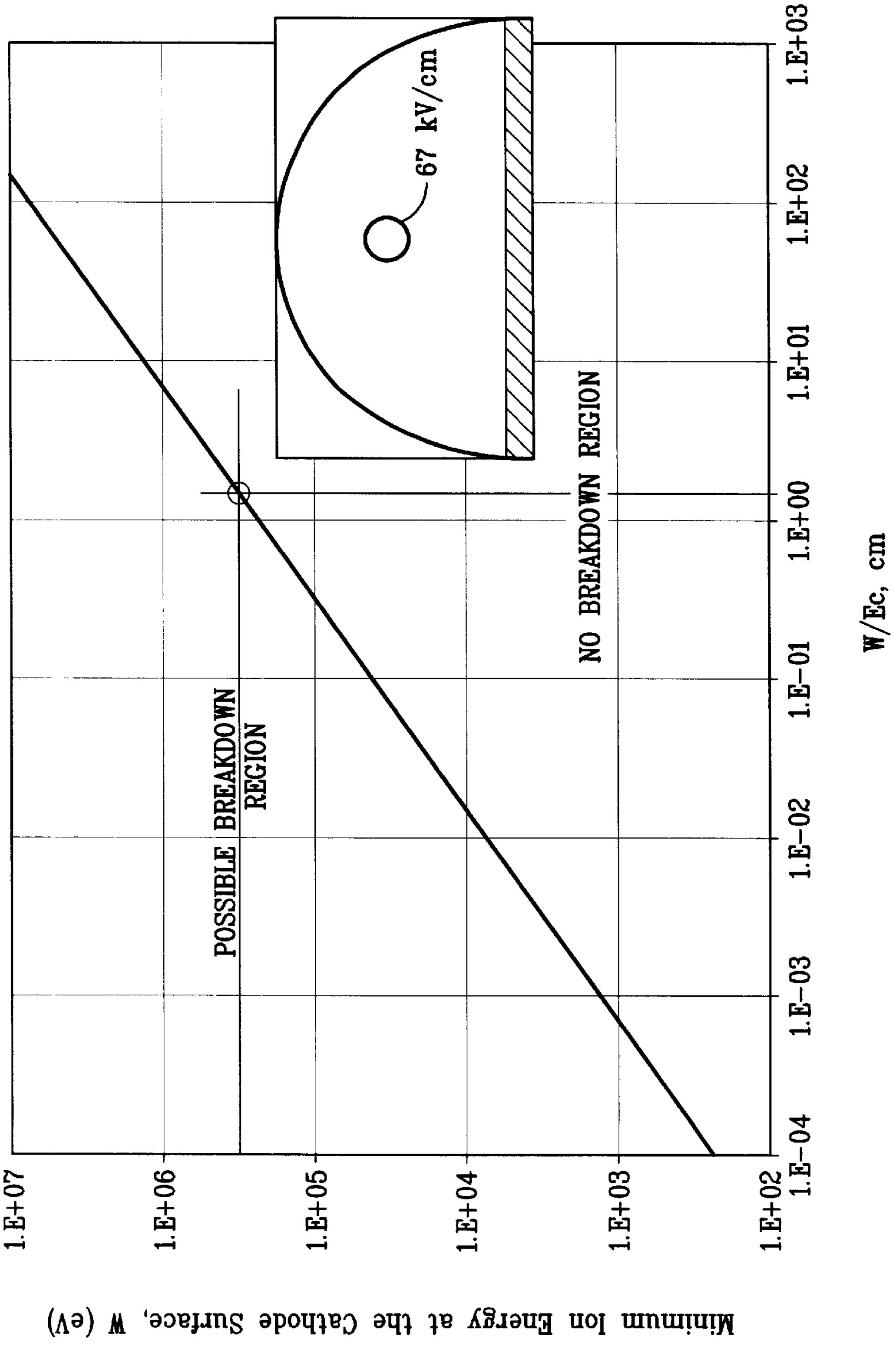
FIG. 7 is a chart of Kilpatrick breakdown criterion corresponding to the example design.

The spacing between grid F and anode plate G is determined by the requirement that direct electrical breakdown must not occur in the presence of the electrical stress between grid F and anode plate G, M. FIG. 7 gives the Kilpatrick breakdown criterion for conditioned electrodes. The curve is based upon empirical data using many different electrode materials, spacings, and electrical potentials. The initiation of electrical breakdown is considered to be due to both field emission and energetic ions striking grid F. The Kilpatrick criterion is a function of both the maximum energy W in FIG. 7 that an energetic ion striking the grid might have and the electric stress $E_c$ in FIG. 7 at the grid surface. In the example design, the electrical potential applied between grid F and the anode is 300 kV. According to FIG. 7 the maximum electrical stress that is tolerable on the grid surface is 67 kV/cm. Equation 4 gives the general formulation for the electrical stress on the grid, where V is the applied voltage, x is the separation distance, and r is the radius of the grid cylinder.

$$E_{max} = f\frac{V}{x} \quad \text{equation 4}$$

$$f = \frac{\sqrt{(2x/r)^2 + 4(2x/r)}}{2\ln\left(x/r + 1 + \frac{1}{2}\sqrt{(2x/r)^2 + 4(2x/r)}\right)}$$

Figure 8:
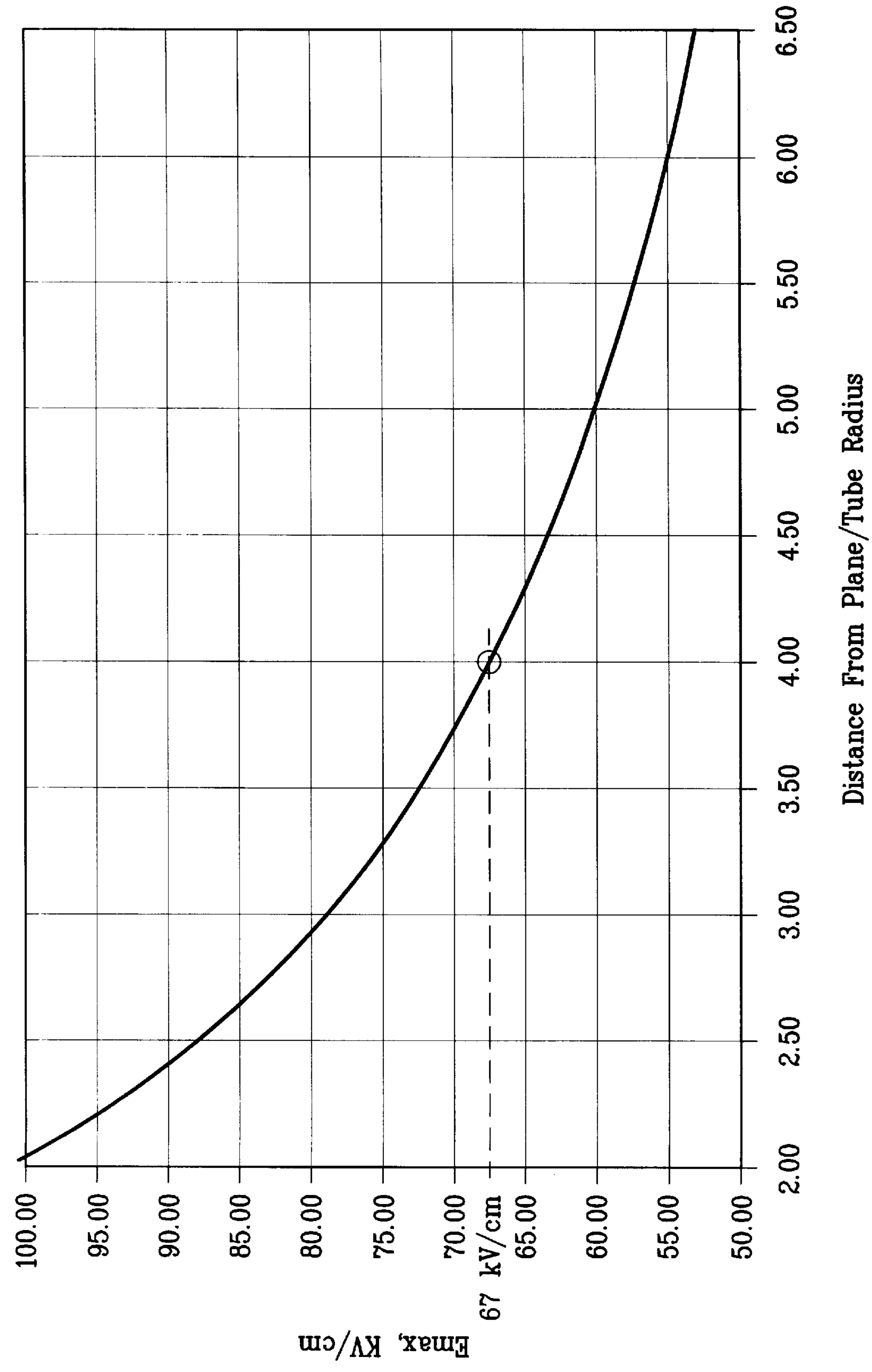
FIG. 8 is a chart of electric stress on a cathode due to a flat anode corresponding to the example design.
Figure 9:
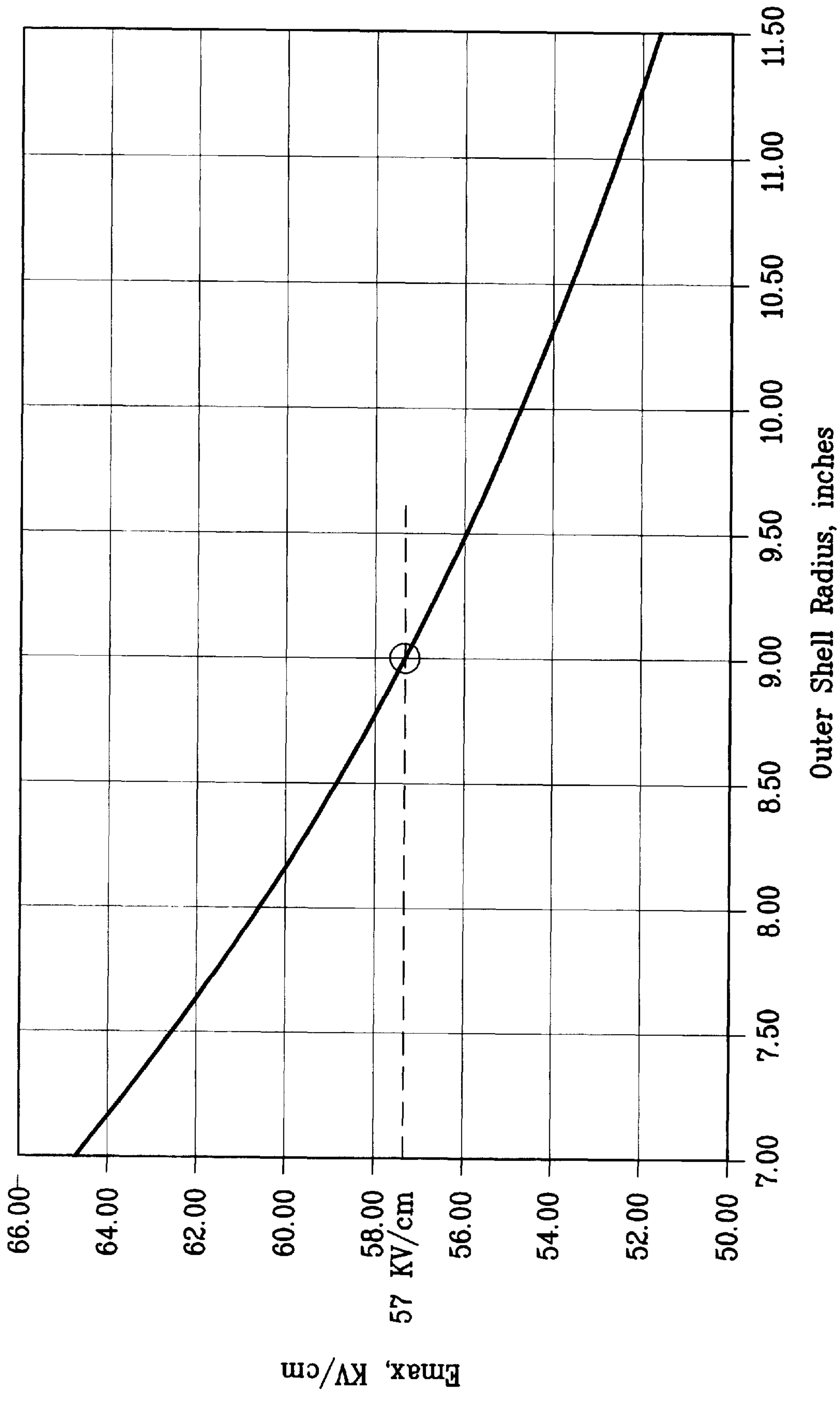
FIG. 9 is a chart of electric stress on a cathode due to an outer shield/filter corresponding to the example design.

FIG. 8 gives the results of using this formulation to determine the value of the ratio of the distance of the grid from the anode to the radius of the grid that yields an electrical stress of 67 kV/cm on the grid. As shown in FIG. 8 the minimum allowable value of this ratio is 4, so if the grid is 5 cm in diameter then it must be more than 10 cm away from the anode to prevent direct electrical breakdown. FIG. 9 shows the same calculation to prevent direct electrical breakdown from the grid to the X-ray window, which is made of titanium and is at the same electrical potential as the anode. An X-ray window radius of 9 inches is highlighted in FIG. 9 because it yields an electrical stress on the grid of 57 kV/cm, safely below the maximum allowable value of 67 kV/cm. In the example design we chose to be even more conservative and used an X-ray window radius of 11.5 inches.

The inside of the X-ray head must be evacuated, so that there are very few molecules to interfere with the acceleration of the electrons from the grid slits to the anode. A vacuum pump is attached at port C in FIG. 4*d* in order to draw this vacuum.

The front face of the vacuum envelope I where the X-rays emerge must be thin and made of a low density, low atomic number material such as titanium. This thin X-ray window material is prevented from collapsing inwardly under the vacuum by rigid ribs K that hold it up much like tent poles hold up a tent's fabric. These ribs are arched for mechanical strength and are made of a mechanically strong material such as stainless steel.

The cathode heats the grid tube so it must be allowed to either radiatively cool or it must be actively cooled by flowing coolant through it via feed-throughs D, E. Radiative grid cooling characteristics can be determined as shown in equation 5.

$$\text{Power}_{[Watt/cm^2]}=\epsilon_t\sigma(T^4-T_0^4)[\text{Watts/cm}^2] \quad \text{equation 5}$$

In equation 5, T is the grid temperature, $T_0$ is the surrounding temperature, $\epsilon_t$ is the emissivity, and $\sigma$ is the Stefan-Boltzmann constant. For the example design, the resulting grid temperature is 830° K. and the resulting filament power is 422 Watts.

Convective grid cooling characteristics can be determined as shown in equation 6.

$$\text{Power}_{[Watts/cm^2]}=169Q_A(T_{out}/T_{in}-1)[\text{Watts/cm}^2] \quad \text{equation 6}$$

In equation 6, $Q_A$ is the air flow [$ft^3$/min], $T_{out}$ is the air outlet temperature, and $T_{in}$ is the air inlet temperature. For the example design, the resulting grid temperature is 310° K., the resulting filament power is 434 Watts, and the resulting air flow is 77 $ft^3$/min.

In either case, the grid could be made of 304 stainless steel. This steel has a melting point of 1783° Kelvin, which is well above the maximum temperature of 830° Kelvin given in equation 5 that it would reach if it were radiatively cooled. The choice of the grid material also must take into consideration electron emission from the grid itself at the operating temperature This emission must be small compared to the main electron current that emerges from the grid slits.

The electrons that bombard the anode also heat it. Therefore, inside the anode plate is a cooling manifold H. The parts of the cooling manifold that hang down are the feeds. Calculations for the required water flow to cool the anode in the example design are given in equation 7.

$$Q_{w[GPM]} = \frac{P_{[Watts]}}{264\Delta T_{water[°C.]}} \quad \text{equation 7}$$

In equation 7, $Q_{w[GPM]}$ is the water flow rate, $P_{[Watts]}$ is the cooling power (150 kW), $\Delta T_{water[°C.]}$ is the temperature rise in water (55° C.). For the example design, the resulting water flow rate is 10.4 GPM.

The X-rays that impinge on the x-ray window I also heat it. Therefore cooling calculations must also be done for the window, and these are set forth in equation 8.

$$\begin{aligned} Power_{[Watts]} &= 169Q_A(T_{out}/T_{in}-1)[\text{Watts}] \quad \text{equation 8} \\ &= 4\% \times 150\,\text{kW} \end{aligned}$$

In equation 8, $Q_A$ is the air flow [$ft^3$/min], $T_{out}$ is the air outlet temperature (355° K.), and $T_{in}$ is the air inlet temperature (300° K.). For the example design, the resulting air flow rate is 193 $ft^3$/min.

In order to make it an efficient Bremsstrahlung X-ray converter, the anode target area G is made of a high density, high atomic number material This material can be expensive and difficult to machine. Only a relatively thin layer of X-ray conversion material is required in the target area on the anode because it stops the electrons in a very short distance. This thin conversion layer can be intimately attached to anode plate M so that there is good thermal conduction into the anode cooling manifold. The example design used flame sprayed tungsten for the converter material and 304 stainless steel for the anode plate and cooling manifold.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. An X-ray tube, comprising:

a) cathode means for supplying electrons;

b) anode means for producing X-ray radiation in response to incident electrons, said anode means mounted relative to said cathode means with a first separation therebetween;

c) acceleration means for urging electrons supplied by said cathode means toward said anode means; and d) magnet means for imposing a magnetic field having field lines substantially aligned with desired trajectories of the electrons that urges electrons toward said anode means.

2. An X-ray tube, comprising:

a) cathode means for supplying electrons;

b) anode means for producing X-ray radiation in response to incident electrons, said anode means mounted relative to said cathode means with a first separation therebetween;

c) acceleration means for urging electrons supplied by said cathode means toward said anode means; and d) magnet means for imposing a magnetic field that urges electrons toward said anode means, wherein said magnet means comprises means for imposing a magnetic field having field lines intersecting said anode means.

3. An X-ray tube, comprising:

a) cathode means for supplying electrons;

b) anode means for producing X-ray radiation in response to incident electrons, said anode means mounted relative to said cathode means with a first separation therebetween, wherein said anode means comprises a target area;

c) acceleration means for urging electrons supplied by said cathode means toward said anode means; and d) magnet means for imposing a magnetic field that urges electrons toward said anode means, wherein said magnet means imposes a magnetic field having field lines that intersect said anode means, wherein substantially every field line that intersects said anode means intersects said target area.

4. An X-ray tube, comprising:

a) cathode means for supplying electrons;

b) anode means for producing X-ray radiation in response to incident electrons, said anode means mounted relative to said cathode means with a first separation therebetween, wherein said anode means comprises an electron impact region;

c) acceleration means for urging electrons supplied by said cathode means toward said anode means; and d) magnet means for imposing a magnetic field that urges electrons toward said anode means, wherein said magnet means imposes a magnetic field having field lines with intersections with said electron impact region and with said anode, and extend toward said cathode means intermediate to said intersections.

5. The X-ray tube of claim 1, wherein said cathode means comprises a conductive material, and wherein said anode means comprises a conductive material, and wherein said acceleration means comprises an electric potential applied between said cathode means and said anode means.

6. The X-ray tube of claim 1, wherein said cathode means is selected from the group consisting of:

a) a thermionic material and means for heating said thermioic material;

b) a ferroelectric material and means for applying a pulsed electric field to said ferroelectric material;

c) a cathode and means for applying an electric field sufficiently intense to cause the cathode to emit electrons;

d) a reservoir of ionized gas; and e) combinations thereof.

7. The X-ray tube of claim 1, wherein said magnet means comprises a magnet made using a material selected from the group consisting of: Alnico, carbon steel, chromium steel, cobalt steel, Cunico, Cunife, Ferroxdur, Silmanol, Vicalloy, Alni, Oerstit, Comol, Remalloy, platinum-cobalt, tungsten-steel, Alcomax, and combinations thereof.

8. The X-ray tube of claim 1, wherein:

a) said cathode means comprises a conductive cathode and a grid mounted therewith, wherein said grid modulates the quantity and initial trajectories of supplied electrons;

b) said anode means comprises a conductive anode having an electron target region;

c) said acceleration means comprises means for imposing an electric field between said cathode means and said anode means, and an envelope adapted to maintain a substantial vacuum in a region inclusive of the cathode and the electron target region, said envelope having a window portion through which X-rays can pass without significant attenuation; and d) said magnet means comprises means for imposing a magnetic field having field lines that intersect said electron target region and said cathode.

9. An X-ray tube, comprising:

a) a cathode mounted with the tube;

b) an anode mounted with the tube;

c) means mounted with the tube for causing electrons to leave said cathode and impact said anode; and d) magnet means mounted with the tube for generating a magnetic field having field lines substantially aligned with desired trajectories of the electrons.

10. The X-ray tube of claim 9, wherein said anode comprises second and third anode portions, and wherein at least one of said magnetic field lines pass through said second anode portion, extend to said cathode, then pass through said third anode portion.

11. The X-ray tube of claim 9, wherein said cathode comprises a grid mounted with said cathode, wherein said grid modulates the quantity and initial trajectories of electrons leaving said cathode.

12. The X-ray tube of claim 9, wherein:

a) said anode has an electron passage therethrough;

b) said anode comprises a front face having an electron impact region thereon;

c) said cathode mounts at a separation from the side opposite the front face of said anode;

d) said magnetic field lines are substantially transverse to electron trajectories from said cathode toward and through said electron passage; and e) said magnetic field bends said electron trajectories to terminate at said electron impact region.

13. The X-ray tube of claim 9 wherein said magnet means comprises a magnet.

14. The X-ray tube of claim 1 wherein said magnet means comprises a magnet.

* * * * *